United States Patent [19]

Shiomi

[11] Patent Number: 5,637,860

[45] Date of Patent: Jun. 10, 1997

[54] IMAGE STABILIZING APPARATUS HAVING AN ANGULAR DISPLACEMENT DETECTING DEVICE FOR BLUR DETECTION

[75] Inventor: Yasuhiko Shiomi, Kawaguchi, Japan

[73] Assignee: Canon Kabushiki Kaisha, Tokyo, Japan

[21] Appl. No.: 493,431

[22] Filed: Jun. 22, 1995

Related U.S. Application Data

[63] Continuation of Ser. No. 332,436, Oct. 31, 1994, abandoned, which is a continuation of Ser. No. 259,342, Jun. 14, 1994, abandoned, which is a continuation of Ser. No. 888,537, May 26, 1992, abandoned.

[30] Foreign Application Priority Data

May 27, 1991 [JP] Japan .................................. 3-121096

[51] Int. Cl.⁶ .......................................... G01T 1/20
[52] U.S. Cl. ............................ 250/201.1; 396/72; 396/89
[58] Field of Search .................................. 250/201.1, 216, 250/230; 354/70, 71, 400, 403, 430, 465; 358/222

[56] References Cited

U.S. PATENT DOCUMENTS 4,531,157  7/1985  Ishikawa ............................. 354/400
4,586,029  4/1986  Tamura et al. ....................... 354/465
4,623,930  11/1986  Oshima et al. ....................... 358/222
5,095,198  3/1992  Nakazawa et al. .................. 250/201.8
5,117,104  5/1992  Kobayashi et al. .................... 250/230

Primary Examiner—Stephone Allen
Attorney, Agent, or Firm—Robin, Blecker, Daley & Driscoll

[57] ABSTRACT

In an image stabilizing apparatus having blur detecting means for detecting the blur of the image of a camera and blur correcting means for correcting the blur of the image of the camera on the basis of the output of the blur detecting means, control is effected so that the supply of electric power to the blur detecting means may be started in response to the camera being released from a state which renders it unable to photograph, and thereafter the supply of electric power to the blur correcting means may be started in response to an operating portion for effecting the photographing by the camera being operated, whereby the wasteful supply of electric power is prevented from being effected to the blur correcting means during the initial stabilizing period required until the blur detecting means performs its proper operation after the start of the supply of electric power thereto, thereby preventing the waste of electric power and further preventing the photographer from being given a malaise.

103 Claims, 4 Drawing Sheets

IMAGE STABILIZING APPARATUS HAVING AN ANGULAR DISPLACEMENT DETECTING DEVICE FOR BLUR DETECTION

This is a continuation application under 37 CFR 1.62 of prior application Ser. No. 08/332 436, filed Oct. 31, 1994 abandoned, which is a continuation of Ser. No. 08/259,342, filed Jun. 14, 1994, abandoned, which is a continuation of Ser. No. 07/888,537, filed May 26, 1992, abandoned.

BACKGROUND OF THE INVENTION

1. Field of the Invention

This invention relates to an image stabilizing apparatus for detecting the blur of an image and correcting the blur of an image on the basis of the result of the detection, and particularly to a method of supplying electric power from the power source thereof.

2. Description of the Related Art

As an image stabilizing apparatus of this kind, there is conceivably a construction in which the blur of the image of a camera is found by the use of an angular displacement sensor as proposed, for example, in U.S. application Ser. No. 619,906 (filed on Nov. 28, 1990) which utilizes the inertia of liquid to detect the amount of angular displacement of the camera relative to absolute space, and the blur of the image is corrected on the basis of the output from the angular displacement sensor by a variable vertical angle prism as shown in Japanese Laid-Open Patent Application No. 2-59718 which utilizes the refractive index of liquid. This variable vertical angle prism can incline the optical path of a photographing optical system with respect to the optical axis in proportion to the vertical angle thereof and therefore, even when the camera is vibrated by the photographer's holding movement, if the variable vertical angle prism is driven in conformity with the state of the hand vibration of the camera detected by the angular displacement sensor, light incident from a point on an object will always be rightly imaged on the surface of film in the camera without being vibrated.

Now, in the above-described image stabilizing apparatus according to the prior art, the power source system thereof is common to the camera body and the power source has been supplied to the image stabilizing apparatus only by the operation of the release button of the camera. Thus, the angular displacement sensor has required initial stabilizing time for eliminating the influence of mechanical unbalance or the like for some time after the supply of electric power has been started, and during that time, no right hand vibration signal is output and therefore, the shutter opening operation cannot be performed and a release time lag of the order of several seconds has occurred, and this has led to very bad usability.

SUMMARY OF THE INVENTION

The present invention has been made in view of the above-noted circumstances and one aspect thereof is to provide an image stabilizing apparatus which is provided with blur detecting means for detecting a blur of an image, blur correcting means for correcting said blur of the image on the basis of the output of said blur detecting means, and control means responsive to a state which renders a camera unable to photograph being released to start the supply of electric power to said blur detecting means, and thereafter responsive to an operating portion for effecting the photographing by the camera being operated to start the supply of electric power to said blur correcting means and in which the supply of electric power to said blur detecting means is started at a point of time where the camera is released from a state in which it is unable to photograph by operations performed when the use of the camera is started, such as the closing of a power source switch and the opening of a lens protecting cover, whereafter the supply of electric power to said blur correcting means is started at a point of time whereat an operation for starting actual photographing is performed, whereby it becomes possible to prevent the waste of the electric power and further, it becomes possible to prevent the photographer from being given a malaise.

One aspect of the invention is to provide an image stabilizing apparatus as described above which is further provided with time counting means for effecting time count in synchronism with the start of the supply of electric power to said blur detecting means, and stopping the supply of electric power to said blur detecting means by terminating the counting of a predetermined time, and reset means for resetting the time counted by said time counting means in response to the operation of the operating portion for effecting the photographing by the camera, or the blur state detected by said blur detecting means, or the photographing state of the camera, whereby the apparatus becomes higher and more practical in the electrical energy saving effect.

DESCRIPTION OF THE PREFERRED EMBODIMENTS

Some embodiments of the present invention will hereinafter be described with reference to the drawings.

Figure 1:
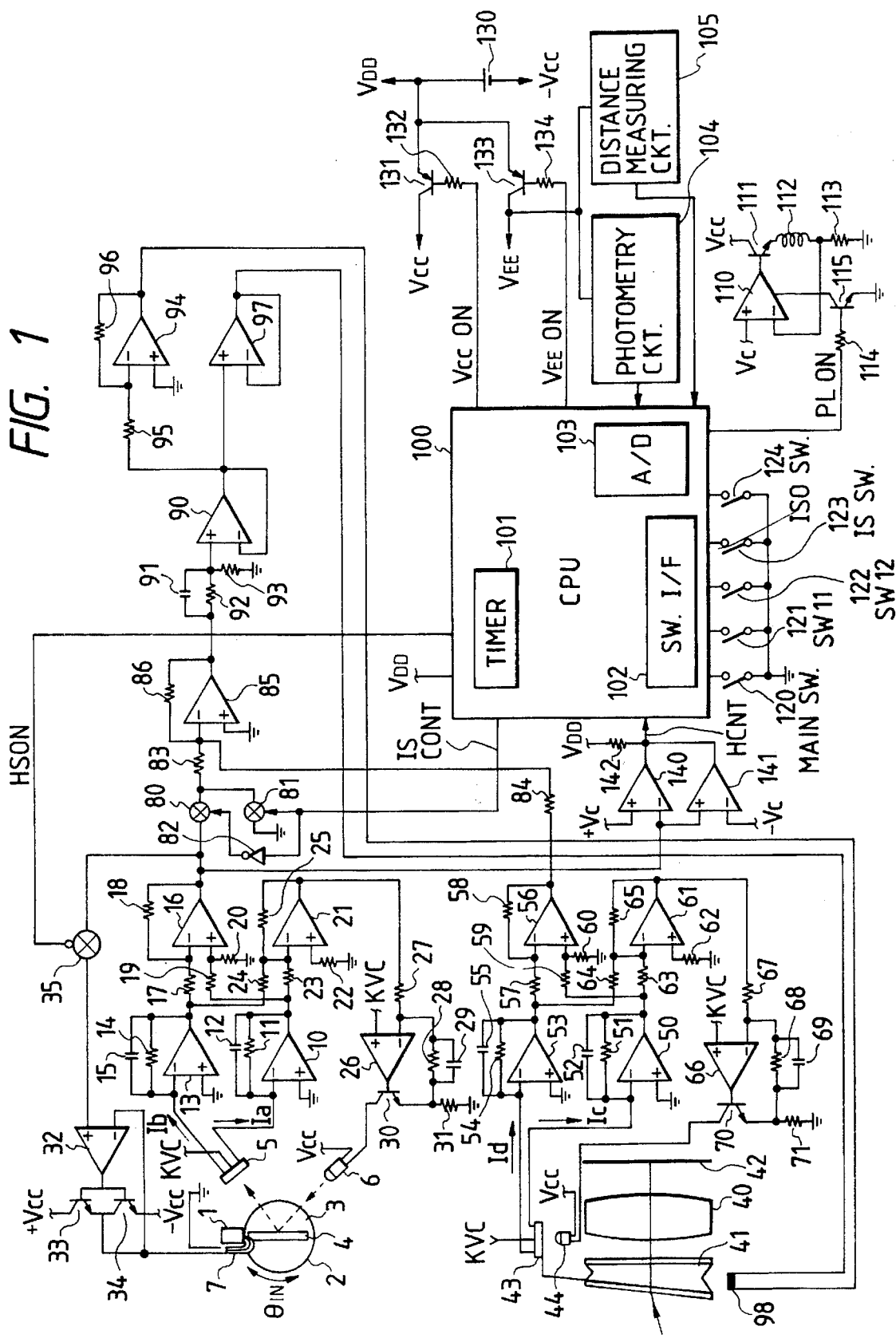
FIG. 1 is a circuit block diagram showing an embodiment of the general construction of an image stabilizing apparatus and a camera according to the present invention.

FIG. 1 is a circuit block diagram showing an embodiment of a general construction of an image stabilizing apparatus and a camera according to the present invention.

The embodiment of FIG. 1 is such that the blur of the image of the camera is detected and the blur of the image is corrected on the basis of the result of the detection, and it uses an angular displacement detecting device as means for detecting the blur of the image, and the construction thereof will hereinafter be described.

In FIG. 1, the angular displacement detecting device comprises a cylindrical case 2 filled with liquid 3 in which is installed a float member 4 of a magnetic material rotatable about a predetermined rotary shaft. Also, a coil 7 is provided which is installed between the float member 4 and a yoke 1 to construct a closed magnetic circuit, as shown.

Assuming that in this state, the case 2 moving with the camera has rotated by θIN relative to absolute space under the influence of hand vibration, the float member 4 therein maintains its stationary state relative to the absolute space due to the inertia of the liquid and thus, the float member 4 has rotated relative to the case 2. Consequently, the amount of this relative displacement can be detected by the use of optical detecting means using a light emitting element 6 comprised of an IRED or the like moving with the camera and a light receiving element 5 comprised of a PSD or the like. Signal light emitted from the light emitting element 6 is reflected by the surface of the float member 4 and enters the light receiving element 5 for position detection, and as a result, the position of incidence of the reflected signal light onto the light receiving element 5 varies if the float member 4 rotates relative to the case 2 and therefore, in conformity with the position of incidence, the output currents Ia and Ib of the light receiving element 5 are varied by the movement of the float member 4. The output currents Ia and Ib are respectively amplified by a current-voltage converting circuit comprised of an OP amplifier 10, a resistor 11 and a capacitor 12 and a current-voltage converting circuit comprised of an OP amplifier 13, a resistor 14 and a capacitor 15, and the respective outputs are input to an addition circuit comprised of an OP amplifier 21 and resistors 22, 23, 24, 25 and a subtraction circuit comprised of an OP amplifier 16 and resistors 17, 18, 19, 20. The output of this addition circuit is input to an iRED driver circuit comprised of an OP amplifier 26, resistors 27, 28, 31, a capacitor 29 and a transistor 30, and feedback control is done so that the output of the addition circuit may become equal to a reference potential KVC.

On the other hand, the angle of displacement of a variable vertical angle prism 41 used as a correcting optical system for correcting the blur of the image is also detected by a method entirely similar to the above-described angular displacement detecting device. That is, a slit operatively associated with the movement of the variable vertical angle prism is provided between a light emitting element 44 such as an IRED and a light receiving element 43 such as a PSD, and by the movement of the slit, photocurrents Ic and Id are produced from the light receiving element 43. These photocurrents Ic and Id are respectively amplified by a current-voltage converting circuit comprised of an OP amplifier 50, a resistor 51 and a capacitor 52 and a current-voltage converting circuit comprised of an OP amplifier 53, a resistor 54 and a capacitor 55, and are respectively input to a subtraction circuit comprised of an OP amplifier 56 and resistors 57, 58, 59, 60 and an addition circuit comprised of an OP amplifier 61 and resistors 62, 63, 64, 65. The output of this addition circuit is input to an iRED driver circuit comprised of an OP amplifier 66, resistors 67, 68, 71, a capacitor 69 and a transistor 70 and therefore, the output of the addition circuit always becomes equal to the reference potential KVC. Thus, the output of subtraction circuit is such that the output of the OP amplifier 16 represents the amount of angular displacement relative to the absolute space which is the output of the angular displacement detecting device and the output of the OP amplifier 56 represents the amount of displacement of the variable vertical angle prism.

The output of the OP amplifier 16 is input to a coil driver comprised of an OP amplifier 32 and transistors 33, 34 and therefore, if an analog switch 35 is ON, the electric current supplied to the coil 7 is determined in conformity with the output of the OP amplifier 16. The analog switch 35 is adapted to become ON when a signal HSON from a CPU is at H level. If an electric current is supplied to the coil 7 placed in the closed magnetic circuit comprised of the yoke 1 and the float member 4 as previously described, a force based on Fleming's left-hand rule is produced and therefore, by controlling this electric current, it is possible to control the movement and characteristic of the sensor.

Also, the output of the OP amplifier 16 is connected to a resistor 83 through an analog switch 80 and the output of the OP amplifier 56 is connected to a resistor 84, and they are both connected to the inverting input terminal of an OP amplifier 85 to which a feedback resistor 86 is connected. The output of the OP amplifier 85 is input to a phase compensation circuit comprised of an OP amplifier 90, resistors 92, 93 and a capacitor 91, whereby the phase compensation of the entire feedback system is done, and further, this output is input to an electric power amplifying circuit comprised of an OP amplifier 97 and an electric power amplifying circuit of the inversion type comprised of an OP amplifier 94 and resistors 95, 96, and by the outputs of these two amplifying circuits, the supply of electric power to a coil 98 for driving the variable vertical angle prism 41 is effected. That is, the variable vertical angle prism 41 is driven to correct the blur of the image in conformity with the output of the angular displacement detecting device.

According to the above-described construction, the variable vertical angle prism can be driven so that the amount of movement thereof may be equal to the output of the sensor which detects the amount of vibration relative to the absolute space, and even if the camera moves relative to the absolute space, the object image formed on the image field of the camera can be kept stationary by the movement of the correcting optical system.

The reference numeral 100 designates a control circuit (hereinafter referred to as the CPU) for effecting the control of the entire construction of FIG. 1. The CPU 100 contains therein a microcomputer, a timer circuit 101 for controlling the time of each state, a switch interface 102 for reading the states of switches 120–124 installed in the camera body, an A/D converter 103 for converting each analog data value measured by a photometry circuit 104 and a distance measuring circuit 105 into digital data, etc.

The reference numeral 120 denotes a main switch adapted to be closed in response to operations for rendering the camera capable of photographing, such as the closing of a power source switch button and the opening of a lens protecting cover, the reference numeral 121 designates a switch (hereinafter referred to as SW1) adapted to be closed by the first stroke of a shutter release button, the reference numeral 122 denotes a switch (hereinafter referred to as SW2) adapted to be closed by the second stroke of the shutter release button, the reference numeral 123 designates an IS switch for selecting whether to cause the image stabilizing function to act, and the reference numeral 124 denotes an ISO switch for reading a DX code on a film cartridge.

Comparators 140, 141 and a resistor 142 together constitute a window comparator for judging whether the output of the angular displacement detecting device (the output of the OP amplifier 16) is within a predetermined range of +Vc to −Vc. That is, when the output of HCNT is at L level, it means that the relative position of the float member 4 of the angular displacement detecting device deviates greatly from a predetermined position, and it is judged that in this state, an accurate image stabilizing operation cannot be performed, and when the output of HCNT is at H level, it is judged that the angular displacement detecting device has come into a predetermined proper detection range.

The reference numeral 130 designates a power supply battery, the reference numeral 131 denotes a transistor for controlling the start or stoppage of the supply of a power source $V_{CC}$, the reference numeral 132 designates a resistor, the reference numeral 133 denotes a transistor for controlling the start or stoppage of the supply of a power source $V_{EE}$, the reference numeral 134 designates a resistor, the reference numeral 104 denotes a conventional photometry circuit for measuring the object luminance, and the reference numeral 105 designates a conventional distance measuring circuit for measuring the object distance. An OP amplifier 110, a transistor 111 and a resistor 113 together constitute a coil constant current driver which effects the supply of electric power to a coil 112 for opening and closing the shutter and performs the exposure operation.

The operation of the construction of FIG. 1 will now be described with reference to the flow chart of FIG. 2 which shows the operation of the CPU 100. First, at a flow 200, the state of MAINONL which memorizes the state of the main switch 120 is examined, and when it is reset to L level, advance is made to a flow 201, where the state of the main switch 120 is detected. If this main switch 120 is OFF, return is made to the flow 200, but if the main switch 120 is ON, it is judged that the main switch 120 has changed from OFF to ON, and the output $V_{CC}ON$ of the CPU 100 is rendered into L level and as the result, the transistor 131 is turned on through the resistor 132, whereby the power source $V_{CC}$ is supplied to the angular displacement detecting device and the rising operation of the angular displacement detecting device is started. Further, at a flow 203, the value of MAINONL is set to H level, and at a flow 204, the timer circuit 101 in the CPU 100 is started, and then return is made to the flow 200. Next, if at the flow 200, MAINONL is set to H level, advance is made to a flow 205, where the state of the main switch 120 is examined, and if the main switch 120 is OFF, it is judged that the main switch 120 has changed from ON to OFF, and advance is made to a flow 206, where MAINONL is reset to L level, whereafter at a flow 209, the output $V_{CC}ON$ is rendered into H level to thereby stop the supply of the power source $V_{CC}$ to the angular displacement detecting device, and at a flow 210, the timer circuit 101 is stopped, and return is made to the flow 200.

On the other hand, if at the flow 205, the main switch 120 is judged to be ON, advance is made to a flow 207, where the state of SW1 is examined, and if this SW1 is ON, the photographing operation is started and at a flow 211, the output $V_{CC}ON$ is rendered into L level, whereafter at a flow 212, the output $V_{EE}ON$ is rendered into L level and as the result, the transistor 133 is turned on through the resistor 134, whereby the power source $V_{EE}$ is supplied to the photometry circuit 104 and the distance measuring circuit 105. Subsequently, at a flow 213, the value measured by the photometry circuit 104 is converted into digital data by the A/D converter 103 and the digital data is memorized in the CPU 100, whereafter at a flow 214, the distance from the camera to the object is calculated by the distance measuring circuit 105, and this is likewise converted into digital data by the A/D converter 103 and the digital data is memorized in the CPU 100. Subsequently, at a flow 215, the timer circuit 101 is reset, whereafter at a flow 216, the state of SW2 is examined, and if this switch is still OFF, advance is made to a flow 222, where the state of SW1 is examined again. If the switch SW1 is in its ON state, return is made to the flow 215, where the above-described operation is repeated, but if here, the switch SW1 becomes OFF, advance is made to a flow 223, where the output $V_{EE}ON$ is rendered into H level and the supply of the power source $V_{EE}$ to the photometry circuit 104 and the distance measuring circuit 105 is stopped. Also, if at the flow 216, SW2 becomes ON, advance is immediately made to a flow 217, where the state of the IS switch 123 is examined and if this IS switch 123 is OFF, the analog switch 81 becomes ON and the analog switch 80 becomes OFF through the inverter 82 to render the output ISCONT into H level at flow 220, and the output of the aforedescribed angular displacement detecting device is cut off from the driving feedback of the variable vertical angle prism 41 and the image stabilizing operation is not performed.

On the other hand, if at the flow 217, the IS switch 123 is in its ON state, advance is made to a flow 218, where the state of the input signal HCNT is judged. The comparators 140, 141 and the resistor 142 which output HCNT together constitute a window comparator as previously described, and this window comparator judges whether the output of the angular displacement detecting device (the output of the OP amplifier 16) is within the predetermined range of +VC to −VC. Accordingly, if at the flow 218, the output HCNT is at L level, it means that the relative position of the float member 4 of the angular displacement detecting device deviates greatly from a predetermined position, and in this state, an accurate image stabilizing operation cannot be performed and therefore, return is made to the flow 216. However, if at the flow 218, the output HCNT is at H level, it is judged that the angular displacement detecting device has come into a predetermined proper detection range, and at a flow 219, the output ISCONT is rendered into L level. If the output ISCONT assumes L level, the analog switch 81 becomes OFF and the analog switch 80 becomes ON through the inverter 82 and therefore, as previously described, the feedback control of the variable vertical angle prism 41 is effected on the basis of the output of the angular displacement detecting device and the image stabilizing operation is started. Subsequently, at a flow 221, PLON is rendered into L level and by this output PLON, the transistor 115 is turned off through the resistor 114 and therefore, the coil 112 is electrically energized by the coil constant current driver comprised of the OP amplifier 110, the transistor 111 and the resistor 113, whereby the actual shutter opening operation is started.

Description will now be made of the operation when at the flow 207, SW1 is OFF. If SW1 remains OFF even when the main switch 120 is opened, at a flow 208, whether the internal timer 101 has counted a predetermined time TE is judged, and if the internal timer 101 has not counted the predetermined time TE, return is made to the flow 200.

If at the flow 208, the internal timer 101 has counted the predetermined time TE, at a flow 209, the output $V_{CC}ON$ is rendered into H level and the supply of the power source $V_{CC}$ is stopped and therefore, the supply of electric power to the image stabilizing apparatus is stopped and at a flow 210, the time counting operation of the internal timer 101 is stopped and the flow returns to step 200.

As described above, in the present embodiment, the driving of only the angular displacement detecting device is started at a point of time whereat the main switch 120 has been closed, and even if a predetermined time has passed thereafter, if SW1 does not become ON, it is judged that the photographer does not wish to photograph, and the electrical energization of the angular displacement detecting device is stopped.

Another embodiment of the operation of the construction of FIG. 1 will now be described with reference to the flow chart of FIG. 3 which shows the operation of the CPU 100.

Figure 2:
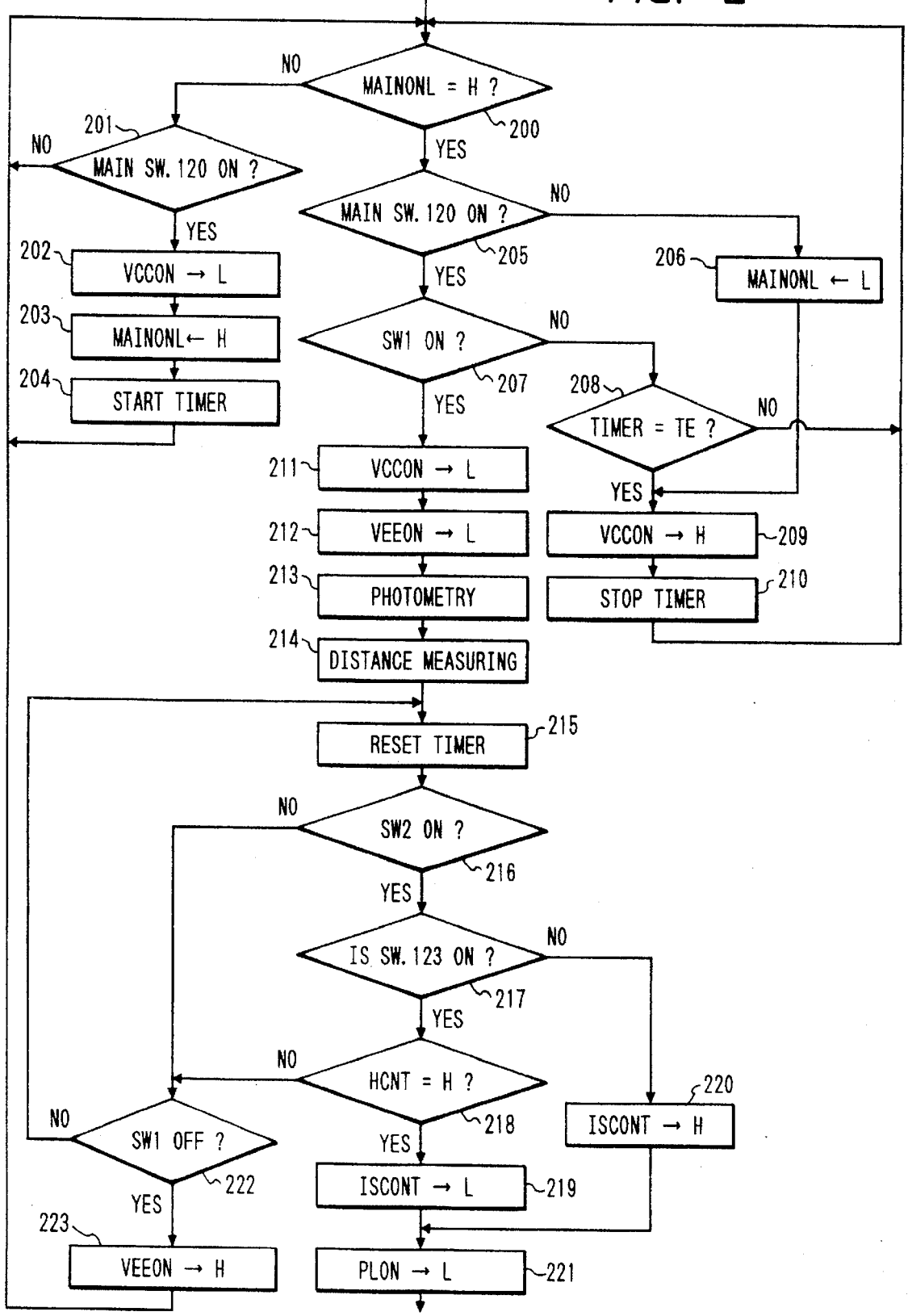
FIG. 2 is a flow chart showing an embodiment of the operation of the CPU 100 of FIG. 1.
Figure 3:
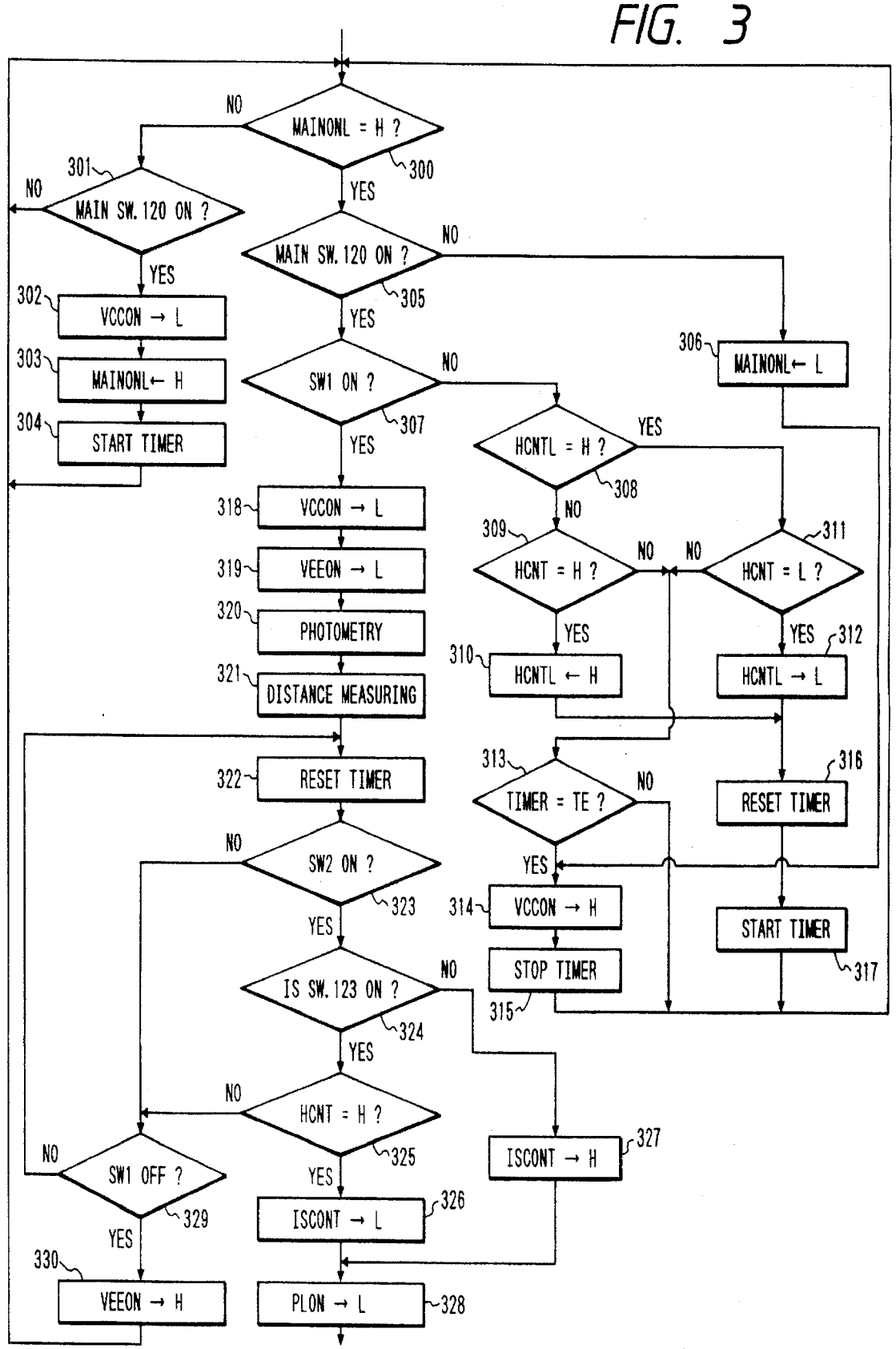
FIG. 3 is a flow chart showing another embodiment of the operation of the CPU 100 of FIG. 1.

In FIG. 3, flows 300–307 correspond to the flows 200–207 of FIG. 2 and flows 318–330 correspond to the flows 211–223 of FIG. 2 and therefore, these flows need not be described. If at the flow 307, SW1 is OFF, the value of HCNTL memorizing the state of the output HCNT of the window comparators 140, 141 which show whether the output of the angular displacement detecting device is within a predetermined range is judged at a flow 308. When at first, HCNTL is reset to L level, advance is made to a flow 309, where the current state of the output HCNT of the window comparators 140, 141 is judged, and if here the output HCNT is at H level, it is judged that the output of the angular displacement detecting device has varied, and at a flow 310, HCNTL is set to H level, and then advance is made to a flow 316, but if HCNT is at L level, it is judged that the output of the angular displacement detecting device has not varied, and advance is made to a flow 313. On the other hand, if at the flow 308, HCNTL is set to H level, the state of the output HCNT is judged at a flow 311, and if here the output HCNT is at L level, it is judged that the output of the angular displacement detecting device has varied, and at a flow 312, HCNTL is set to L level, and then advance is made to a flow 316, but if the output HCNT is at H level, it is judged that the output of the angular displacement detecting device has not varied, and advance is made to a flow 313.

When the angular displacement detecting device is performing a predetermined operation by the photographer's holding, the output HCNT repeats H level/L level and therefore, in such case, at the flow 316, the internal timer circuit 101 is reset, and at a flow 317, the internal timer circuit 101 is simply started again and return is made to the flow 300. However, if the camera is left somewhere, photographing is not effected even when the photographer closes the main switch 120, the angular displacement signal by hand vibration is not produced and therefore, the output of the angular displacement detecting device remains fixed at H level or L level, and at this time, whether this state has continued for a predetermined time TE is judged at a flow 313. If the predetermined time TE has not passed, return is immediately made to the flow 300, but if the time count value by the internal timer circuit 101 has reached the predetermined time TE, advance is made to a flow 314, where the output $V_{CC}ON$ is rendered into H level and the supply of the power source $V_{CC}$ is stopped and the electrical energization of the angular displacement detecting device is stopped, and then at a flow 315, the time counting operation of the internal timer circuit 101 is stopped and the flow returns to step 300.

As described above, in the present embodiment, at a point of time whereat the main switch 120 has been closed, only the angular displacement detecting device starts to be electrically energized, and if the output of the angular displacement detecting device does not vary for a predetermined time thereafter, it is judged that the photographing operation is not performed, and the electrical energization of the angular displacement detecting device is stopped.

Still another embodiment of the operation of the construction of FIG. 1 will now be described with reference to the flow chart of FIG. 4 which shows the operation of the CPU 100.

Figure 4:
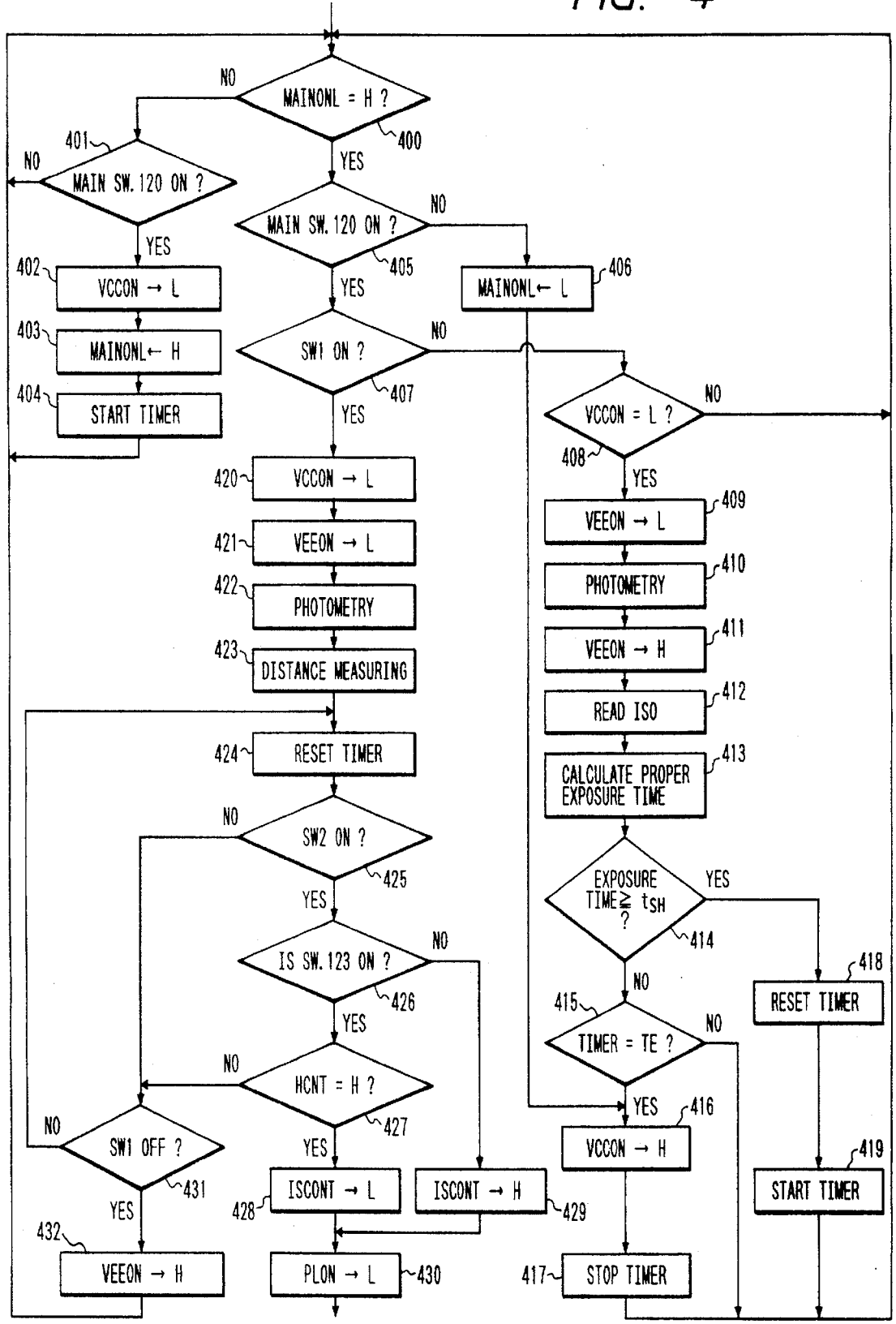
FIG. 4 is a flow chart showing still another embodiment of the operation of the CPU 100 of FIG. 1.

In FIG. 4, flows 400–407 correspond to the flows 200–207 of FIG. 2 and flows 420–432 correspond to the flows 211–223 of FIG. 2 and therefore, these flows need not be described.

If at a flow 407, SW1 is OFF, whether the output $V_{CC}ON$ is at L level is judged at a flow 408, and if the output $V_{CC}ON$ is at H level, advance is immediately made to the flow 400, but if the output $V_{CC}ON$ is at L level, at a flow 409, the output $V_{EE}ON$ is rendered into L level and the supply of the power source $V_{EE}$ to the photometry circuit 104 is started. At a flow 410, the output measured by the photometry circuit 104 is converted into digital data by the A/D converter 103, whereafter at a flow 411, the output $V_{EE}ON$ is rendered into H level and the supply of the power source $V_{EE}$ is stopped. Subsequently, at a flow 412, the DX code on the film cartridge is read by the ISO switch 124, whereafter at a flow 413, a proper exposure time is calculated. If at a flow 414, the proper exposure time is longer than a predetermined time $t_{SH}$, it is judged that the environment is one which requires image stabilization photographing, and at a flow 418, the internal timer circuit 101 is reset and at a flow 419, the internal timer circuit 101 is restarted, and then return is made to the flow 400. On the other hand, if at the flow 414, the proper exposure time is shorter than the predetermined time $t_{SH}$, it is judged that the environment is one which does not require image stabilization photographing, and advance is made to a flow 415, and if at this flow, the time count value by the internal timer circuit 101 reaches a predetermined value, advance is made to a flow 416, where the output $V_{CC}ON$ is rendered into H level can the supply of the power source $V_{CC}$ is stopped to thereby stop the electrical energization of the angular displacement detecting device, whereafter at a flow 417, the time counting by the internal timer circuit 101 is stopped and the flow returns to step 400.

As described above, in the present embodiment, the electrical energization of only the angular displacement detecting device is started at a point of time whereat the main switch 120 has been closed, and if the environmental state which does not require the image stabilizing operation lasts thereafter, the electrical energization of the angular displacement detecting device is stopped.

In the present embodiment, an angular displacement sensor is used as the blur detecting means, but the present invention will be effective even if another sensor such as an acceleration sensor or a speed sensor is used.

Also, in the present embodiment, description has been made of an image stabilizing apparatus for correcting the blur in still camera, but of course, the present invention is also effective in other cameras and further, the present invention will be effective even if instead of the release button of a still camera, another operating portion such as the photographing starting button of a video camera is used as the operating portion for effecting photographing.

Also, the present embodiment has been described as using a variable vertical angle prism as the blur correcting means, but the present invention is also effective with respect to blur correcting means having another correcting mechanism.

What is claimed is:

1. A blur detection apparatus, comprising:
   (a) blur detection means for detecting blur;
   (b) timer means for counting time in accordance with starting an operation of said blur detection means; and
   (c) control means for stopping the operation of said blur detection means in accordance with said timer means counting a predetermined time period.

2. An apparatus according to claim 1, further comprising prohibition means for prohibiting said control means from stopping the operation of said blur detection means.

3. An apparatus according to claim 2, wherein said prohibition means includes means which prohibits said control means from inputting a signal which indicates said timer means has counted the predetermined time period.

4. An apparatus according to claim 3, wherein said prohibition means includes means for preventing said timer means from counting time.

5. An apparatus according to claim 4, wherein said prohibition means includes reset means for resetting said timer means.

6. An apparatus according to claim 2, further comprising blur correction means for correcting blur in accordance with an output of said blur detection means.

7. An apparatus according to claim 6, wherein said prohibition means includes means for performing the prohibition in accordance with the starting of blur correction by said blur correction means.

8. An apparatus according to claim 7, wherein said blur correction means includes means for starting the operation of said blur correction means in response to an operation which causes a photographing operation of the camera.

9. An apparatus according to claim 2, wherein said prohibition means includes means for performing the prohibition in accordance with an operational state of the camera.

10. An apparatus according to claim 9, wherein said prohibition means includes means for performing the prohibition in response to an operation which causes a photographing operation of the camera.

11. An apparatus according to claim 6, wherein said prohibition means includes means for performing the prohibition in accordance with a state which necessitates blur correction.

12. An apparatus according to claim 11, wherein said prohibition means includes means for performing the prohibition in response to an exposure time of the camera exceeding a predetermined time.

13. An apparatus according to claim 11, wherein said prohibition means includes means for performing the prohibition in accordance with a change of an output of said blur detection means.

14. An apparatus according to claim 2, wherein said prohibition means includes means for performing the prohibition in accordance with a state of the camera.

15. An apparatus according to claim 14, wherein said prohibition means includes means for performing the prohibition in accordance with a photographing state of the camera.

16. An apparatus according to claim 15, wherein said prohibitions means includes means for performing the prohibition in accordance with an exposure time of the camera.

17. An apparatus according to claim 2, wherein said prohibition means includes means for performing the prohibition in accordance with an output of said blur detection means.

18. An apparatus according to claim 1, further comprising switch means for starting said blur detection means to operate.

19. An apparatus according to claim 18, wherein said switch means includes means for starting said blur detection means to operate in response to operation of a power switch of the camera.

20. A blur detection apparatus, comprising:
 (a) blur detection means for detecting blur;
 (b) timer means for counting time in accordance with starting an operation of said blur detection means; and
 (c) control means for restricting the operation of said blur detection means in accordance with said timer means counting a predetermined time period.

21. An image stabilizing apparatus, comprising:
 (a) blur detection means operational for detecting blur;
 (b) timer means for counting time in accordance with starting an operational state of said blur detection means; and
 (c) control means for maintaining the operational state of said blur detection means until expiration of a predetermined time period counted by said timer means.

22. An image stabilizing system, comprising:
 (a) blur detection means for detecting blur;
 (b) timer means for counting time in accordance with starting an operation of said blur detection means;
 (c) blur correction means for compensating the blur in accordance with an output of said blur detection means; and
 (d) control means for restricting the operation of said blur detection means in accordance with said timer means counting a predetermined time period.

23. An image stabilizing system, comprising:
 (a) blur detection means for detecting blur;
 (b) timer means for counting time in accordance with starting an operational state of said blur detection means;
 (c) blur correction means for compensating the blur in accordance with an output of said blur detection means; and
 (d) control means for maintaining the operational state of said blur detection means until expiration of a predetermined time period counted by said timer means.

24. An optical system, comprising:
 (a) blur detection means for detecting blur;
 (b) timer means for counting time in accordance with starting an operation of said blur detection means;
 (c) blur correction means for compensating the blur in accordance with an output of said blur detection means; and
 (d) control means for restricting the operation of said blur detection means in accordance with said timer means counting a predetermined time period.

25. An optical system, comprising:
 (a) blur detection means operational for detecting blur;
 (b) timer means for counting time in accordance with starting an operational state of said blur detection means;
 (c) blur correction means for compensating the blur in accordance with an output of said blur detection means; and
 (d) control means for maintaining the operational state of said blur detection means until expiration of a predetermined time period counted by said timer means.

26. A camera, comprising:
 (a) camera housing;
 (b) blur detection means for detecting blur;
 (c) timer means for counting time in accordance with starting an operation of said blur detection means; and
 (d) control means for restricting the operation of said blur detection means in accordance with said timer means counting a predetermined time period.

27. A camera, comprising:
 (a) camera housing;
 (b) blur detection means for detecting blur;
 (c) timer means for counting time in accordance with starting an operational state of said blur detection means; and
 (e) control means for maintaining the operational state of said blur detection means in accordance with said timer means counting a predetermined time period.

28. An apparatus adapted to be used for an image blur prevention apparatus having an image blur prevention portion for preventing an image blur in accordance with an output of an image blur detection portion for detecting the image blur comprising:
 first means for inputting a first signal and for changing a state of the image blur detection portion; and second means for inputting a second signal independently of the first signal in a state where the state of the image blur detection portion is changed by said first means and for starting an operation of the image blur prevention portion.

29. An apparatus according to claim 28, wherein said first means includes means for starting the operation of the image blur detection portion in accordance with the first signal.

30. An apparatus according to claim 28, wherein said first means includes means for starting an energizing to the first image blur detection portion in accordance with the first signal.

31. An apparatus according to claim 28, wherein said second means includes means for causing the image blur prevention portion to start an image blur prevention operation corresponding to an output of the image blur detection portion in accordance with the second signal.

32. An apparatus according to claim 28, wherein said first means includes means for inputting a signal responding that a power supply of the image blur prevention apparatus is turned on.

33. An apparatus according to claim 28, wherein the image blur prevention portion includes an image blur prevention optical means for performing image blur prevention by deflecting a light beam for forming an image, said first means includes means for inputting a signal responding that a light shield by a light shield portion is released, the light shield portion is for prohibiting the light beam from being incident on the image blur prevention optical means.

34. An apparatus according to claim 28, wherein the image blur detection portion includes means for detecting a fluctuation of an apparatus including a portion being prevented from image blur by the image blur prevention portion.

35. An apparatus according to claim 28, wherein the image blur prevention portion includes means for deflecting a light beam for forming an image.

36. An apparatus according to claim 28, wherein said second means includes means for inputting a signal corresponding to a state of a photographing portion for photographing using an image being prevented from image blur by the image blur prevention portion.

37. An apparatus according to claim 36, wherein said second means includes means for inputting a signal corresponding to a switch for causing the photographing portion to perform an image recording operation for the photographing.

38. An apparatus according to claim 28, wherein said first means includes means for inputting a signal corresponding to a state of a photographing portion for photographing using an image being prevented from image blur by the image blur prevention portion.

39. An apparatus according to claim 38, wherein said first means includes means for inputting a signal corresponding to a switch for an operation of a focus adjustment or a photometric operation for the photographing by the photographing portion.

40. An apparatus according to claim 38, wherein said photographing portion is included in a camera, said first means includes means for inputting a signal in accordance with a first operation of a release operation portion of the camera, and said second means includes means for inputting a signal in accordance with a second operation which is performed in succession after the first operation.

41. An apparatus according to claim 38, wherein said first means includes means for inputting a signal corresponding to a switch for causing the photographing portion to be in a photograph possible state.

42. An apparatus according to claim 41, wherein said first means for inputting a signal responding that a power supply of an apparatus including the photographing portion is turned on.

43. An apparatus according to claim 41, wherein said first means includes means for inputting a signal responding that a light shield by a light shield portion is released, the light shield portion is for prohibiting a light beam used for the photographing from being incident on the photographing portion.

44. An apparatus according to claim 28, wherein at least one of said first means and said second means includes means for inputting a signal in accordance with an operation of a release member of a camera.

45. An apparatus according to claim 44, wherein said first means includes means for inputting the signal in accordance with the operation of the release member of the camera.

46. An apparatus according to claim 45, wherein said first means includes means for inputting the signal in accordance with the operation of the release member for performing at least one of a photometry and a distance measuring.

47. An apparatus according to claim 44, wherein said second means includes means for inputting the signal in accordance with the operation of the release member of the camera.

48. An apparatus according to claim 47, wherein said second means includes means for inputting the signal in accordance with the operation of the release member for causing the camera to start an image recording operation.

49. An image blur prevention apparatus comprising:
image blur prevention means for performing an image blur prevention in accordance with an output of an image blur detection portion for detecting image blur;
first means for inputting a first signal and for changing a state of said image blur detection portion; and
second means for inputting a second signal independently of the first signal in a state where the state of the image blur prevention means is changed by said first means and for starting an operation of said image blur prevention means.

50. An apparatus according to claim 49, wherein said first means includes means for starting the operation of the image blur detection portion in accordance with the first signal.

51. An apparatus according to claim 49, wherein said second means includes means for causing the image blur prevention means to start an image blur prevention operation corresponding to an output of the image blur detection portion in accordance with the second signal.

52. An apparatus according to claim 49, wherein said second means includes means for inputting a signal corresponding to a state of a photographing portion for photographing using an image being prevented from image blur by the image blur prevention means, and wherein said second means includes means for inputting a signal corresponding to a switch for causing the photographing portion to perform an image recording operation for the photographing.

53. An apparatus according to claim 49, wherein the image blur detection portion includes means for detecting a fluctuation of an apparatus including a portion being prevented from image blur by the image blur prevention means.

54. An apparatus according to claim 49, wherein the image blur prevention means includes means for deflecting a light beam for forming an image.

55. An apparatus according to claim 49, wherein the apparatus includes the image blur detection portion.

56. An apparatus according to claim 49, wherein said first means includes means for inputting a signal corresponding to a state of a photographing portion for photographing using an image being prevented from image blur by the image blur prevention means.

57. An apparatus according to claim 56, wherein said first means for inputting a signal responding that a power supply of an apparatus including the photographing portion is turned on.

58. An apparatus according to claim 56, wherein said first means includes means for inputting a signal responding that a light shield by a light shield portion is released, the light shield portion is for prohibiting a light beam used for the photographing from being incident on the photographing portion.

59. An apparatus according to claim 56, wherein said first means includes means for inputting a signal corresponding to a switch for an operation of a focus adjustment or a photometric operation for the photographing by the photographing portion.

60. An apparatus according to claim 49, wherein at least one of said first means and said second means includes means for inputting a signal in accordance with an operation of a release member of a camera.

61. An apparatus according to claim 60, wherein said first means includes means for inputting the signal in accordance with the operation of the release member of the camera.

62. An apparatus according to claim 60, wherein said second means includes means for inputting the signal in accordance with the operation of the release member of the camera.

63. An optical equipment comprising:
 first means for inputting a first signal and for changing a state of an image blur detection portion for detecting image blur of an image used by the optical equipment; and
 second means for inputting second signal independently of the first signal in a state where the state of the image blur detection portion is changed by said first means and for starting an operation of an image blur prevention portion for preventing image blur of the image used by the optical equipment.

64. An equipment according to claim 63, wherein said first means includes means for starting the operation of the image blur detection portion in accordance with the first signal.

65. An equipment according to claim 63, wherein said second means includes means for causing the image blur prevention portion to start an image blur prevention operation corresponding to an output of the image blur detection portion in accordance with the second signal.

66. An equipment according to claim 63, wherein said first means includes means for inputting a signal responding that a power supply of the equipment is turned on.

67. An equipment according to claim 63, wherein said first means includes means for inputting a signal responding that a light shield by a light shield portion is released, the light shield portion is for prohibiting a light beam used by the equipment from being incident on the equipment.

68. An equipment according to claim 63, wherein the equipment includes the image blur detection portion.

69. An equipment according to claim 63, wherein the equipment includes the image blur prevention portion.

70. An equipment according to claim 63, wherein the equipment is a camera.

71. An equipment according to claim 70, wherein said first means includes means for inputting a signal corresponding to a switch for an operation of a focus adjustment or a photometric operation for the photographing by the camera.

72. An equipment according to claim 70, wherein said second means includes means for inputting a signal corresponding to a switch for causing the camera to perform an image recording operation for the photographing.

73. An equipment according to claim 70, wherein said first means includes means for inputting a signal in accordance with a first operation of a release operation portion of the camera, and said second means includes means for inputting a signal in accordance with a second operation of the release operation portion which is performed in succession after the first operation.

74. An apparatus according to claim 63, wherein at least one of said first means and said second means includes means for inputting a signal in accordance with an operation of a release member of a camera.

75. An apparatus according to claim 74, wherein said first means includes means for inputting the signal in accordance with the operation of the release member of the camera.

76. An apparatus according to claim 74, wherein said second means includes means for inputting the signal in accordance with the operation of the release member of the camera.

77. An apparatus adapted to be used for an image blur prevention apparatus having an image blur prevention portion for preventing an image blur in accordance with an output of an image blur detection portion for detecting the image blur comprising:
 first means for inputting a first signal and for changing a state of the image blur detection portion; and
 second means for inputting a second signal independently of the first signal in a state where the state of the image blur detection portion is changed by said first means and for changing a state of the image blur prevention portion between an operation state and a non-operative state.

78. An apparatus according to claim 77, wherein said second means includes means for changing the image blur prevention portion to the operative state from the non-operative state in accordance with the second signal.

79. An image blur prevention apparatus comprising:
 image blur prevention means for performing an image blur prevention in accordance with an output of an image blur detection portion for detecting image blur;
 first means for inputting a first signal and for changing a state of said image blur detection portion; and
 second means for inputting a second signal independently of the first signal in a state where the state of the image blur detection portion is changed by said first means and for changing a state of the image blur prevention means between an operative state and a non-operative state.

80. An apparatus according to claim 78, wherein said second means includes means for changing the image blur prevention means to the operative state from the non-operative state in accordance with the second signal.

81. An apparatus according to claim 79, wherein at least one of said first means and said second means includes means for inputting a signal in accordance with an operation of a release member of a camera.

82. An apparatus according to claim 81, wherein said first means includes means for inputting the signal in accordance with the operation of the release member of the camera.

83. An apparatus according to claim 81, wherein said second means includes means for inputting the signal in accordance with the operation of the release member of the camera.

84. An apparatus according to claim 77, wherein at least one of said first means and said second means includes means for inputting a signal in accordance with an operation of a release member of a camera.

85. An apparatus according to claim 84, wherein said first means includes means for inputting the signal in accordance with the operation of the release member of the camera.

86. An apparatus according to claim 84, wherein said second means includes means for inputting the signal in accordance with the operation of the release member of the camera.

87. An optical equipment comprising:

first means for inputting a first signal and for changing a state of an image blur detection portion for detecting image blur of an image used by the optical equipment; and second means for inputting a second signal independently of the first signal in a state where a state of the image blur detection portion is changed by said first means and for changing a state of an image blur prevention portion for preventing image blur of an image used by the optical equipment between an operation state and a non-operative state.

88. An equipment according to claim 87, wherein said second means includes means for changing the image blur prevention portion to the operative state from the non-operative state in accordance with the second signal.

89. An apparatus according to claim 87, wherein at least one of said first means and said second means includes means for inputting a signal in accordance with an operation of a release member of a camera.

90. An apparatus according to claim 89, wherein said first means includes means for inputting the signal in accordance with the operation of the release member of the camera.

91. An apparatus according to claim 89, wherein said second means includes means for inputting the signal in accordance with the operation of the release member of the camera.

92. An apparatus adapted to be used for an image blur prevention apparatus having an image blur prevention portion for preventing an image blur in accordance with an output of an image blur detection portion for detecting the image blur comprising:

first means for inputting a first signal and for changing a state of the image blur detection portion; and second means for inputting a second signal independently of the first signal in a state where the state of the image blur detection portion is changed by said first means and for starting an operation of the image blur prevention portion and wherein at least one of said first means and said second means includes means for inputting a signal in accordance with an operation of a release member of a camera.

93. An apparatus according to claim 92, wherein said first means includes means for inputting the signal in accordance with the operation of the release member of the camera.

94. An apparatus according to claim 92, wherein said second means includes means for inputting the signal in accordance with the operation of the release member of the camera.

95. An image blur prevention apparatus comprising:

image blur prevention means for performing an image blur prevention in accordance with an output of an image blur detection portion for detecting image blur;

first means for inputting a first signal and for changing a state of said image blur detection portion; and second means for inputting a second signal independently of the first signal in a state where the state of the image blur prevention means is changed by said first means and for starting an operation of said image blur prevention means wherein at least one of said first means and said second means includes means for inputting a signal in accordance with an operation of a release member of a camera.

96. An apparatus according to claim 95, wherein said first means includes means for inputting the signal in accordance with the operation of the release member of the camera.

97. An apparatus according to claim 95, wherein said second means includes means for inputting the signal in accordance with the operation of the release member of the camera.

98. An apparatus adapted to be used for an image blur prevention apparatus having an image blur prevention portion for preventing an image blur in accordance with an output of an image blur detection portion for detecting the image blur comprising:

first means for inputting a first signal and for changing a state of the image blur detection portion; and second means for inputting a second signal independently of the first signal in a state where the state of the image blur detection portion is changed by said first means and for changing a state of the image blur prevention portion between an operation state and a non-operative state wherein at least one of said first means and said second means includes means for inputting a signal in accordance with an operation of a release member of a camera.

99. An apparatus according to claim 98, wherein said first means includes means for inputting the signal in accordance with the operation of the release member of the camera.

100. An apparatus according to claim 98, wherein said second means includes means for inputting the signal in accordance with the operation of the release member of the camera.

101. An image blur prevention apparatus comprising:

an image blur prevention means for performing an image blur prevention in accordance with an output of an image blur detection portion for detecting image blur;

first means for inputting a first signal and for changing a state of said image blur detection portion; and second means for inputting a second signal independently of the first signal in a state where the state of the image blur detection portion is changed by said first means and for changing a state of the image blur prevention means between an operative state and a non-operative state wherein at least one of said first means and said second means includes means for inputting a signal in accordance with an operation of a release member of a camera.

102. An apparatus according to claim 101, wherein said first means includes means for inputting the signal in accordance with the operation of the release member of the camera.

103. An apparatus according to claim 101, wherein said second means includes means for inputting the signal in accordance with the operation of the release member of the camera.

* * * * *

UNITED STATES PATENT AND TRADEMARK OFFICE
CERTIFICATE OF CORRECTION

PATENT NO. : 5,637,860

DATED : June 10, 1997

INVENTOR(S) : Shiomi et. al.

It is certified that error appears in the above-identified patent and that said Letters Patent is hereby corrected as shown below:

Col. 1, line 7, delete "Ser. No. 08/332 436" and insert -- 08/332,436 --.

Col. 2, line 9, delete "whereat" and insert -- where --.

Col. 3, line 57, delete "become ON" and insert -- be ON --.

Col. 8, line 22, delete "whereat" and insert -- where --.

Col. 14, line 53, delete "claim 78" and insert -- claim 79 --.

Signed and Sealed this

Twenty-first Day of July, 1998

Attest:

BRUCE LEHMAN

Attesting Officer

Commissioner of Patents and Trademarks